US006938912B1

(12) United States Patent
Norton et al.

(10) Patent No.: US 6,938,912 B1
(45) Date of Patent: Sep. 6, 2005

(54) TRAILER HITCH PROTECTORS AND METHODS

(75) Inventors: Don S. Norton, Clinton, MS (US); Eddie Slater, Indianola, MS (US)

(73) Assignee: United Plastics Molders, Inc., Jackson, MS (US)

( * ) Notice: Subject to any disclaimer, the term of this patent is extended or adjusted under 35 U.S.C. 154(b) by 0 days.

(21) Appl. No.: 10/839,218

(22) Filed: May 6, 2004

(51) Int. Cl.$^7$ .............................................. B60R 21/34
(52) U.S. Cl. ...................................... 280/507; 280/770
(58) Field of Search ............................... 150/166, 167; 280/507, 504, 770, 511

(56) References Cited

U.S. PATENT DOCUMENTS

| 3,596,926 | A | * | 8/1971 | Randall | ...................... | 280/507 |
| 5,533,743 | A | * | 7/1996 | Bello | .......................... | 280/507 |
| 5,575,494 | A | * | 11/1996 | DeVries | ...................... | 280/507 |
| 5,651,559 | A | * | 7/1997 | Liland et al. | ............... | 280/507 |
| 5,806,873 | A | * | 9/1998 | Glassman | ................... | 280/507 |
| 6,039,339 | A | * | 3/2000 | Bello | .......................... | 280/507 |
| 6,412,806 | B1 | * | 7/2002 | Peacock | ..................... | 280/507 |
| 2003/0085548 | A1 | * | 5/2003 | Morgan | ...................... | 280/507 |
| 2004/0130125 | A1 | * | 7/2004 | Dougherty | .................. | 280/507 |

FOREIGN PATENT DOCUMENTS

EP              0320202     *  6/1989   ............ B60D 1/06

* cited by examiner

Primary Examiner—Avraham Lerner
(74) Attorney, Agent, or Firm—Nixon & Vanderhye, P.C.

(57) ABSTRACT

Trailer hitch protectors have a flexible body member sized and configured to be sleeved over a tow bar tongue associated with a trailer hitch assembly. The body member most preferably includes an opposed pair of generally U-shaped inner and outer lateral walls which are spaced apart from one another so as to define a cushion space therebetween and thereby provide cushioned protection laterally of the tow bar tongue when received within the body member. A series of spaced-apart flexible connecting webs extending between said inner and outer lateral walls within the cushion space may be provided so as to provide further cushioning effect. In especially preferred embodiments, the flexible body member has an upper wall joined to both the inner and outer lateral walls, and has an aperture adapted to surround a hitch ball attached to the tow bar tongue of the trailer hitch assembly. The upper wall will thereby include a pair of opposed upper neck flanges which define therebetween a slit opening to allow access to said aperture therein. Similarly, the flexible body member may include a lower wall joined to the inner lateral wall and spaced from the upper wall to define a generally U-shaped channel therewith. The U-shaped channel thus accommodates a rearward portion of the tow bar tongue of the trailer hitch assembly so as to allow the body member to be sleeved thereover. The lower wall most preferably has an aperture in opposed registry to the aperture formed in said upper wall.

16 Claims, 5 Drawing Sheets

TRAILER HITCH PROTECTORS AND METHODS

FIELD OF THE INVENTION

The present invention relates generally to trailer hitch assemblies. In especially preferred embodiments, the present invention relates to cushioned protectors for tow bar tongues associated with trailer hitch assemblies so as to prevent injuries that may occur when a person moves around the rear end of a vehicle.

BACKGROUND AND SUMMARY OF THE INVENTION

Vehicle trailer hitch assemblies having a tow bar tongue and trailer hitch ball are typically not removed after a trailer has been unhitched from the vehicle. Instead, the trailer hitch assembly remains physically in place at the lower rear end of the vehicle. The presence of the trailer hitch assembly presents an obstacle to a person's freely moving around the rear end of the vehicle as it extends rearwardly away from the vehicle a substantial distance therefrom (e.g., more or less about one foot). As may be appreciated, the obstacle presented by the trailer hitch assembly can injure a person (typically in the shin and/or knee regions) who is unaware of its presence. As such, providing the trailer hitch assembly with a cushioned protector is desirable.

Several proposals exist in the art for providing conventional trailer hitch assemblies with cushioned protection. One example of a prior art hitch protector is the HITCH HALO™ protector commercially available from Diversified Products Company of Stamford, Conn. which includes a flexible polymeric U-shaped element which laterally bounds the trailer hitch assembly and thereby creates a cushion zone therearound.

Another example of a prior art hitch protector is the HUSKY SHIN PROTECTOR™ commercially available from TJ Trailers of Salt Lake City, Utah which is a one-piece U-shaped flexible body member adapted to being positioned onto the upper surface of the tow bar tongue while the hitch ball is removed. An aperture is formed in the flexible body member to allow the hitch ball to then be reattached to the tow bar tongue. A series of vertical cushioning ribs extend laterally from the side of the flexible body member to provide the cushioned protection.

While the prior art hitch protectors described above do providing a measure of cushioning to a trailer hitch assembly, further improvements are still desirable. For example, it would especially be desirable if the entire protector could be positioned onto the tow bar tongue without disassembly of the hitch ball and yet provided increased measure of cushioning. It is towards providing such improvements that the present invention is directed.

Broadly, the present invention is embodied in trailer hitch protectors having a flexible body member sized and configured to be sleeved over a tow bar tongue associated with a trailer hitch assembly. Most preferably, the body member includes an opposed pair of generally U-shaped inner and outer lateral walls which are spaced apart from one another so as to define a cushion space therebetween and thereby provide cushioned protection laterally of the tow bar tongue when received within the body member. A series of spaced-apart flexible connecting webs extending between said inner and outer lateral walls within the cushion space may be provided so as to provide further cushioning effect.

In especially preferred embodiments, the flexible body member has an upper wall joined to both the inner and outer lateral walls, and has an aperture adapted to surround a hitch ball attached to the tow bar tongue of the trailer hitch assembly. The upper wall will thereby include a pair of opposed upper neck flanges which define therebetween a slit opening to allow access to said aperture therein.

Similarly, the flexible body member may include a lower wall joined to the inner lateral wall and spaced from the upper wall to define a generally U-shaped channel therewith. The U-shaped channel thus accommodates a rearward portion of the tow bar tongue of the trailer hitch assembly so as to allow the body member to be sleeved thereover. The lower wall most preferably has an aperture in opposed registry to the aperture formed in said upper wall. In such a manner, the hitch ball is installed on the tongue does not necessarily need to be removed, but could be removed if desired once the protector has been sleeved thereover (e.g., to allow a different size hitch ball to be installed).

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
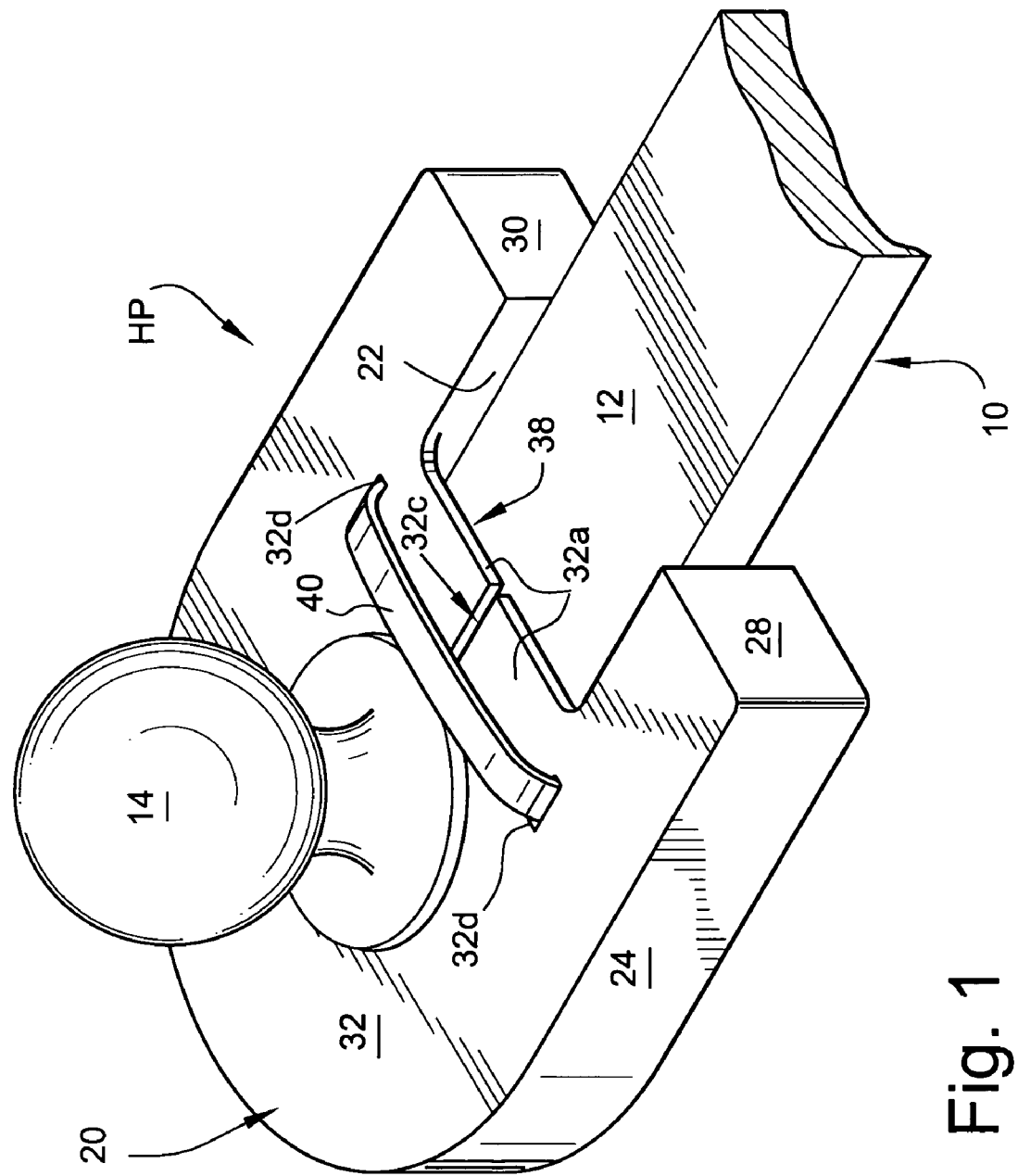
FIG. 1 is a rear perspective view of a trailer hitch assembly which includes a hitch protector in accordance with the present invention.

Accompanying FIG. 1 depicts a conventional trailer hitch assembly 10 having a tow bar tongue 12 whose near end thereof is attached rigidly to a vehicle's tow bar (not shown) and a far end thereof supports a hitch ball 14. The hitch protector HP in accordance with the present invention is shown as being sleeved over a rearward portion of the tow bar tongue 12 of the hitch assembly 10. The hitch ball 14 protrudes upwardly away from the hitch protector HP to provide unimpeded access thereto. As a result, a hitch socket associated with a trailer (not shown) may be coupled operatively to the hitch ball 14 without removal of the hitch protector HP.

Figure 2:
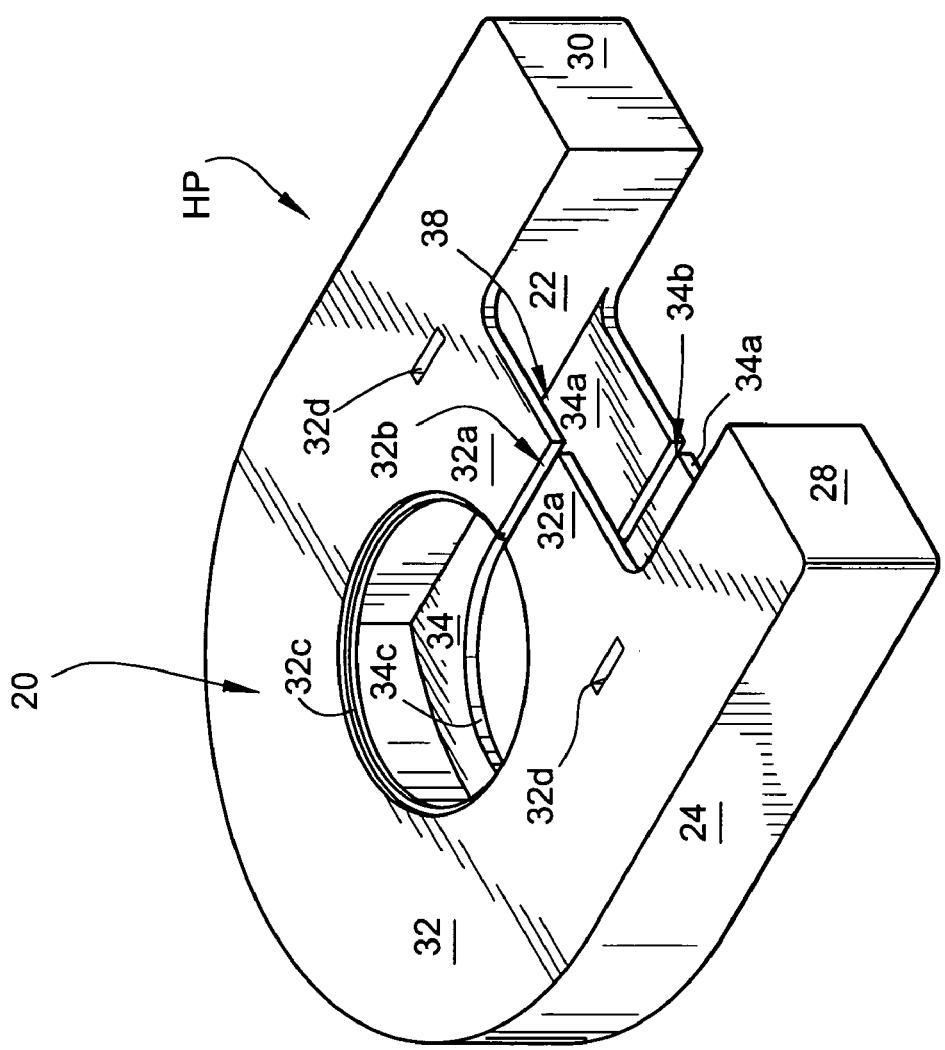
FIG. 2 is top perspective view of the hitch protector in accordance with the present invention.
Figure 3:
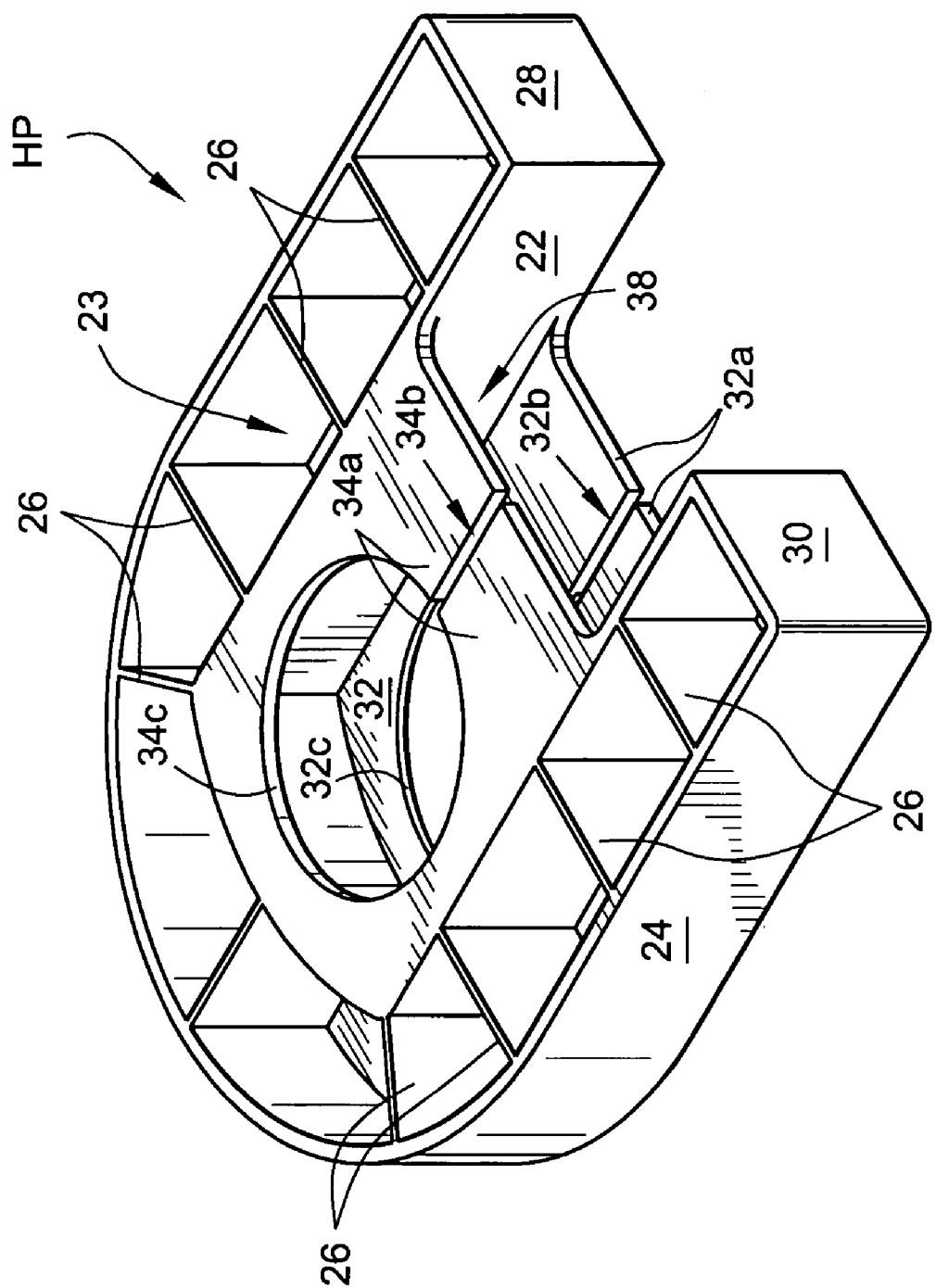
FIG. 3 is a bottom perspective view of the hitch protector depicted in FIG. 2.

As is perhaps more clearly shown in FIGS. 2–3, the hitch protector HP of the present invention is most preferably embodied in a flexible one-piece (i.e., unitary) generally U-shaped body member 20 formed from a suitable elastomeric material. In this regard, virtually any durable elastomeric material may be employed in the practice of the present invention. For example, synthetic rubbers such as EPDM rubbers, polychloroprene rubbers (e.g., NEOPRENE® elastomers commercially available from DuPont of Wilmington, Del.), chlorosulphonated polyethylene rubbers, thermoplastic elastomers and the like may be satisfactorily employed. Presently preferred is SANTOPRENE® thermoplastic elastomer commercially available from Advanced Elastomer Systems of Akron, Ohio.

The body member 20 includes a pair of generally U-shaped spaced-apart inner and outer lateral wall members 22, 24. The U-shaped space 23 between the inner and outer wall members 22, 24 is maintained by a series of connecting webs 26 (see FIG. 3). These connecting webs 26, together with the space between wall members 22, 24, provide a safety cushion laterally of the tow bar tongue 12 when the body member 20 is installed thereon as shown in FIG. 1. A pair of end walls 28, 30 closes the terminal ends of the U-shaped space 23 defined between the inner and outer walls 22, 24.

An upper wall 32 covers the upper extent of body member 20 and closes the top portion of U-shaped space 23. A bottom wall 34 opposes the upper wall 32 (see FIG. 3) in spaced relationship thereto so as to define a U-shaped channel 36 adapted to receive therein an end portion of the tow bar tongue 12. Each of the upper and lower walls 32, 34 includes an opposed pair of neck flanges 32a, 34a which establish a split opening 32b, 34b, respectively. The split openings 32b, 34b thereby allow access to the apertures 32c, 34c defined in the upper and lower walls 32, 34, respectively, so that the hitch protector HP may be installed onto the hitch assembly 10 without disassembly of the hitch ball 14 from the tow bar tongue 12. Similarly, the apertures 32c, 34c formed in the upper and lower walls 32, 34, respectively, permit the hitch ball 14 to be removed from the tow bar tongue 12 if desired (e.g., to allow the size of the hitch ball 14 to be changed to accommodate different sizes of trailer sockets) without removal of the hitch protector HP once it has been installed. The upper and lower walls, 32, 34, respectively, together with the inner wall 22 thereby defines a partially enclosed U-shaped channel 38 which accepts therein a rearward portion of the tow bar tongue 12.

The upper wall 32 of the body member 20 includes a pair of laterally spaced apart slots 32d which are sized and configured to accept a tie strap 40 used to attach the hitch protector HP to the tow bar tongue 12.

Figure 4:
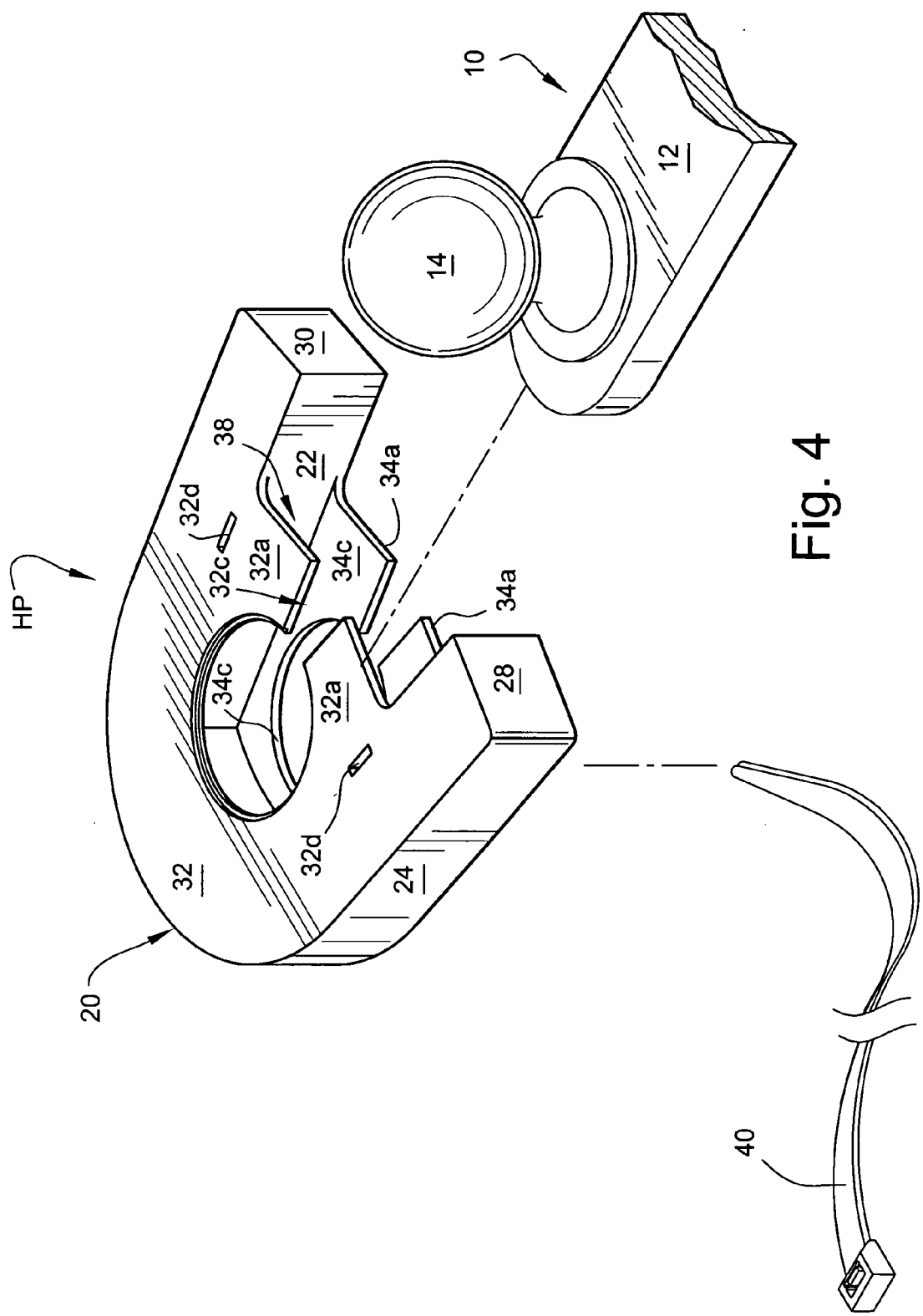
FIGS. 4 and 5 depict a technique by which the hitch protector of this invention may be installed onto a trailer hitch assembly.
Figure 5:
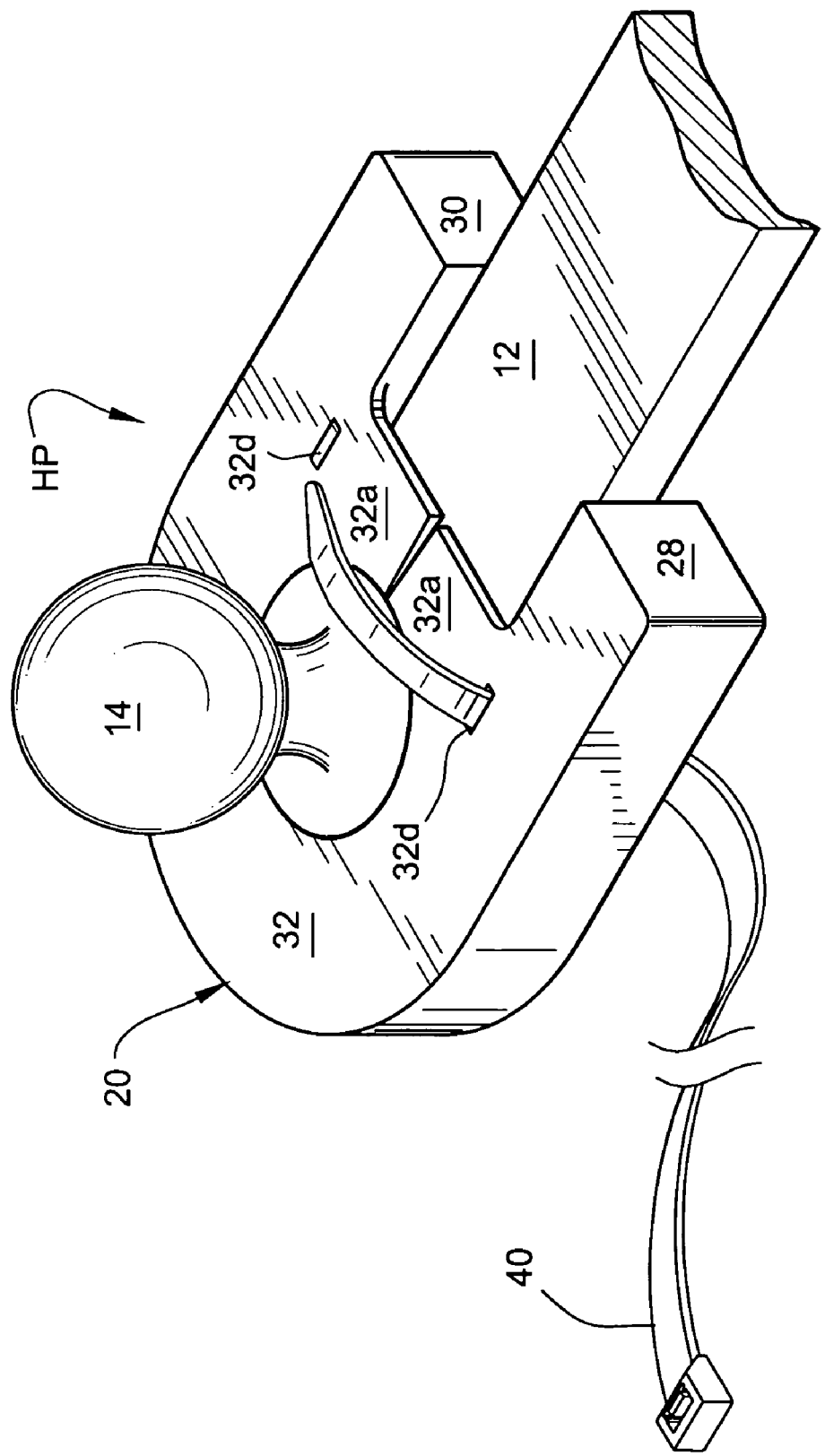

The hitch protector HP of this invention is most preferably installed over the tow bar tongue 12 of the hitch assembly 10 by initially spreading the terminal ends of the U-shaped body member 20 so as to increase the size of the slit openings 32c, 34c defined between the neck flanges 32a, 34a, respectively, as shown in FIG. 4. In such a state, the rearward portion of the tow bar tongue 12 may be inserted into the channel 38 until the hitch ball 14 is positioned within the aperture 32c. The spreading force may then be relaxed to allow the inherent resiliency of the body member 20 to close around the tow bar tongue 12 and thereby be positioned on its rearward portion as shown in FIG. 5. The tie strap 40 may then be laced through each of the slots 32d in the upper wall 32 and then tied tightly underneath the tow bar tongue 12 so as to positionally retain the body member 20 thereon and achieve the state depicted in FIG. 1.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A trailer hitch protector comprising a flexible body member sized and configured to receive a tow bar tongue associated with a trailer hitch assembly, wherein said body member includes an opposed pair of generally U-shaped inner and outer lateral walls which are spaced apart from one another so as to define a cushion space therebetween and thereby provide cushioned protection laterally of the tow bar tongue when received within said body member, wherein said upper wall comprises a pair of opposed upper neck flanges which define therebetween a slit opening to allow access to said aperture in said upper wall, and wherein said flexible body member includes a lower wall joined to said inner lateral wall and spaced from said upper wall to define a generally U-shaped channel therewith to accommodate the tow bar tongue of the trailer hitch assembly.

2. The trailer hitch protector as in claim 1, wherein said flexible body member further includes a series of spaced-apart connecting webs extending between said inner and outer lateral walls.

3. The trailer hitch protector as in claim 1, wherein said lower wall has an aperture in opposed registry to the aperture formed in said upper wall.

4. The trailer hitch protector as in claim 3, wherein said lower wall comprises a pair of opposed lower neck flanges which define therebetween a slit opening to allow access to said aperture in said lower wall.

5. The trailer hitch protector as in claim 1, wherein said flexible body member includes a lower wall joined to said inner lateral wall and spaced from said upper wall to define a generally U-shaped channel therewith to accommodate the tow bar tongue of the trailer hitch assembly.

6. The trailer hitch protector as in claim 5, wherein said lower wall has an aperture.

7. The trailer hitch protector as in claim 6, wherein said lower wall comprises a pair of opposed lower neck flanges which define therebetween a slit opening to allow access to said aperture in said lower wall.

8. A trailer hitch protector comprising a flexible body member sized and configured to receive a tow bar tongue associated with a trailer hitch assembly, and a tie strap, wherein said body member includes an opposed pair of generally U-shaped inner and outer lateral walls which are spaced apart from one another so as to define a cushion space therebetween and thereby provide cushioned protection laterally of the tow bar tongue when received within said body member, wherein said flexible body member has an upper wall joined to said inner and outer lateral walls, said upper wall having an aperture adapted to surround a hitch ball of the trailer hitch assembly, and wherein said upper wall defines a pair of spaced-apart slots for receiving said tie strap to positionally restrain said body member on the tow bar tongue.

9. The a trailer hitch assembly having a tow bar tongue, a hitch ball attached to said tow bar tongue, and a trailer hitch protector as in any one of claims 1–2 and 3–8 sleeved over said tow bar tongue so as to provide cushioned protection about its lateral edge.

10. A method of providing a tow bar tongue associated with a trailer hitch assembly with cushioned protection about its lateral edges, said method comprising installing a trailer hitch protector as in any one of claims 1–2 and 3–8 onto a rearward portion of the tow bar tongue.

11. A method of providing a tow bar tongue associated with a trailer hitch assembly with cushioned protection comprising:

(a) providing a trailer hitch protector having a flexible body member sized and configured to receive the tow bar tongue, wherein said body member includes an opposed pair of generally U-shaped inner and outer lateral walls which are spaced apart from one another so as to define a cushion space therebetween and thereby provide cushioned protection laterally of the tow bar tongue when received within said body member, the flexible body member includes an upper wall having an aperture, and an opposed pair of upper neck flanges defining therebetween a slit opening to allow access to the aperture in the upper wall;

(b) applying opposite lateral spreading forces to terminal ends of the flexible body member so as to cause the opposed pair of upper neck flanges to spread apart thereby dimensionally increasing the slit opening;

(c) sleeving the flexible body member over the tow bar tongue by inserting a rearward portion of the tow bar tongue into the channel so that the hitch ball is forced through the dimensionally increased slit until the hitch ball is positioned within the aperture; and (d) relaxing the spreading forces to allow the body member to resiliently close around the tow bar tongue and thereby be positioned on the rearward part thereof with the hitch ball received within and extending outwardly from the aperture.

12. The method of claim 11, further comprising (e) lacing a tie strap through slots formed in the upper wall of the protector to positionally retain the flexible body member on the tow bar tongue.

13. A trailer hitch protector comprising:

a flexible body member sized and configured to receive a tow bar tongue associated with a trailer hitch assembly, wherein the flexible body member includes an opposed pair of generally U-shaped inner and outer lateral walls which are spaced apart from one another so as to define a cushion space therebetween and thereby provide cushioned protection laterally of the tow bar tongue when received within said body member, and wherein the flexible body member further includes an upper wall having an aperture, and a pair of opposed upper neck flanges which define therebetween a slit opening extending from the aperture, and wherein the opposed upper neck flanges being spreadable relative to one another in response to application of opposed lateral spreading forces applied to terminal ends of the hitch protector so as to dimensionally increase the slit opening defined therebetween and to thereby allow a rearward portion of the tow bar tongue to be inserted into the protector and to cause the hitch ball to be forced through the dimensionally increased slit until the hitch ball is positioned within the aperture, whereupon subsequent relaxation of the spreading forces allows the body member to resiliently close around the tow bar tongue and thereby be positioned on the rearward part thereof with the hitch ball received within and extending outwardly from the aperture.

14. The trailer hitch protector as in claim 13, wherein said flexible body member further includes a series of spaced-apart connecting webs extending between said inner and outer lateral walls.

15. The trailer hitch as in claim 13, wherein said flexible body member includes a lower wall joined to said inner lateral wall and spaced from said upper wall to define a generally U-shaped channel therewith to accommodate the tow bar tongue of the trailer hitch assembly.

16. The trailer hitch protector as in claim 13, further comprising a tie strap, and wherein said upper wall defines a pair of spaced-apart slots for receiving said tie strap to positionally restrain said body member on the tow bar tongue.

* * * * *